(12) United States Patent
Akechi et al.

(10) Patent No.: US 9,790,624 B2
(45) Date of Patent: Oct. 17, 2017

(54) COATING FABRIC FOR AIRBAGS AND METHOD FOR MANUFACTURING THE SAME

(75) Inventors: Tsutomu Akechi, Shiga (JP); Mamoru Kitamura, Shiga (JP)

(73) Assignee: Toyobo Co., Ltd., Osaka (JP)

( * ) Notice: Subject to any disclaimer, the term of this patent is extended or adjusted under 35 U.S.C. 154(b) by 31 days.

(21) Appl. No.: 13/257,648

(22) PCT Filed: May 24, 2010

(86) PCT No.: PCT/JP2010/003466
§ 371 (c)(1),
(2), (4) Date: Sep. 20, 2011

(87) PCT Pub. No.: WO2010/137282
PCT Pub. Date: Dec. 2, 2010

(65) Prior Publication Data
US 2012/0015573 A1    Jan. 19, 2012

(30) Foreign Application Priority Data

May 29, 2009  (JP) .................................. 2009-130128
May 29, 2009  (JP) .................................. 2009-130129

(51) Int. Cl.
*B60R 21/235* (2006.01)
*D06N 3/00* (2006.01)
(Continued)

(52) U.S. Cl.
CPC ............. *D03D 13/008* (2013.01); *D03D 1/02* (2013.01); *D06N 3/0006* (2013.01); *D06N 3/128* (2013.01);
(Continued)

(58) Field of Classification Search
CPC ...... D03D 13/008; D03D 1/02; D06N 3/0006; D06N 3/128; D06N 2209/067;
(Continued)

(56) References Cited

U.S. PATENT DOCUMENTS 5,529,837 A * 6/1996 Fujiki .................. B60R 21/235
280/728.1
5,607,183 A * 3/1997 Nishimura ............ B60R 21/233
280/743.1
(Continued)

FOREIGN PATENT DOCUMENTS

EP    1 270 800 A1    1/2003
EP    1 548 180 A1    6/2005
(Continued)

OTHER PUBLICATIONS

Standard No. 302: Flammability of Interior Materials; 49 CFR 571.302, Oct. 1, 2002.*
(Continued)

*Primary Examiner* — Frank Vineis
(74) *Attorney, Agent, or Firm* — Fish & Richardson P.C.

(57) ABSTRACT

The present invention provides a coating fabric for airbags where an elastomer is coated to at least one side of textile constituted from synthetic fiber filament, which is characterized in that the coating weight of the resin is as small as 10 to 20 g/m² and an average resin thickness of the head top in the textile surface is 4.0 μm to 12.0 μm in both directions of warp and weft and that the average value of burning speed measured according to FMVSS 302 is not more than 60 mm/min in both directions of warp and weft and the maximum value thereof is not more than 1.2-fold to the average value in both directions of warp and weft.

11 Claims, 2 Drawing Sheets

(51) Int. Cl.
*D03D 1/02* (2006.01)
*D06N 3/12* (2006.01)
*D03D 13/00* (2006.01)

(52) U.S. Cl.
CPC ........... *B60R 2021/23514* (2013.01); *D06N 2209/067* (2013.01); *D06N 2211/268* (2013.01); *Y10T 442/20* (2015.04)

(58) Field of Classification Search
CPC .... D06N 2211/268; B60R 2021/23514; Y10T 428/13; Y10T 428/1352; Y10T 428/1362
USPC ....... 442/59, 60, 76, 81, 164, 168, 169, 186, 442/286; 428/34.1, 35.7, 36.1, 446, 447; 280/728.1, 743.1; 524/837; 525/478
See application file for complete search history.

(56) References Cited

U.S. PATENT DOCUMENTS

| | | | |
|---|---|---|---|
| 5,989,660 A | 11/1999 | Moriwaki et al. | |
| 2001/0046823 A1 | 11/2001 | Sogi et al. | |
| 2004/0077236 A1* | 4/2004 | Ishii | B60R 21/235 442/76 |
| 2009/0061716 A1* | 3/2009 | Tanaka | D01F 1/07 442/302 |
| 2010/0009583 A1* | 1/2010 | Bringley | D06M 13/282 442/80 |
| 2015/0132607 A1* | 5/2015 | Yamanaka | C07F 9/65718 428/704 |

FOREIGN PATENT DOCUMENTS

| | | |
|---|---|---|
| JP | 06-008779 | 1/1994 |
| JP | 07-300774 | 11/1995 |
| JP | 09-240405 | 9/1997 |
| JP | 2001-288413 A | 10/2001 |
| JP | 2003-041487 | 2/2003 |
| JP | 2008-138305 | 6/2008 |
| WO | 2008/069296 A1 | 6/2008 |

OTHER PUBLICATIONS

ASTM, Standard Test Methods for Horizontal Burning Rate of Flexible Cellular and Rubber Materials Used in Occupant Compartments of Motor Vehicles, D-5132-93, 1995.*
JIS, Road vehicles and tractors and machinery for agriculture and forestry Determination of burning behaviour of interior materials, JIS 1201, 1998.*
ISO, Road vehicles and tractors and machinery for agriculture and forestry—Determination of burning behaviour of interior materials ISO 3795, 1989.*
Interview Agenda for Mar. 24, 2015.*
Fung, Walter, Coated and Laminated Textiles, Woodhead Publishing, 2002, pp. 85-86.*
Wacker Chemical, ELASTOSIL® LR 6200 A Saftey Data Sheet, Nov. 2012.*
European Patent Office, Supplementary European Search Report for Appln. No. 10 78 0243 (dated Feb. 1, 2013).
International Akzo Symposium on Automotive Occupant Restraint Systems, & Grieger, M.-P. (1998). *Bag & Belt '98: 5th International Akzo Symposium on Occupant Restraint Systems*, May 13-15, 1998, Martim Hotel Köln, Cologne, Germany : [conference papers]. Wuppertal: Akzo Faser AG, Industrial Fabrics Dept.

* cited by examiner

[Fig. 1]
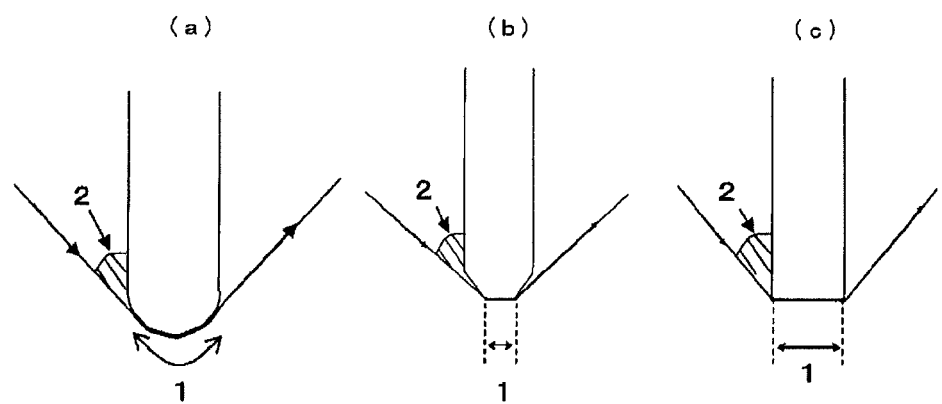
[Fig. 2]
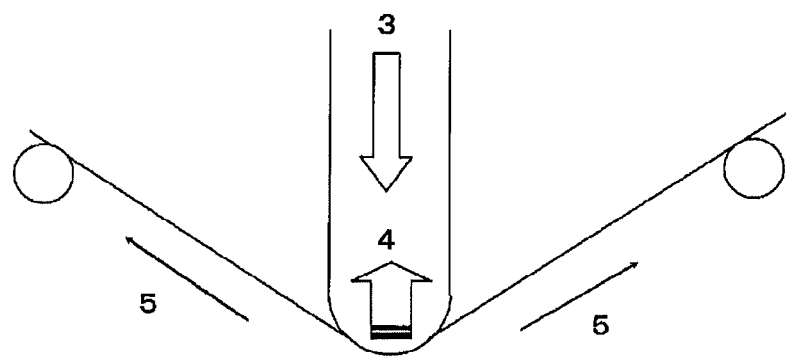

[Fig. 3]
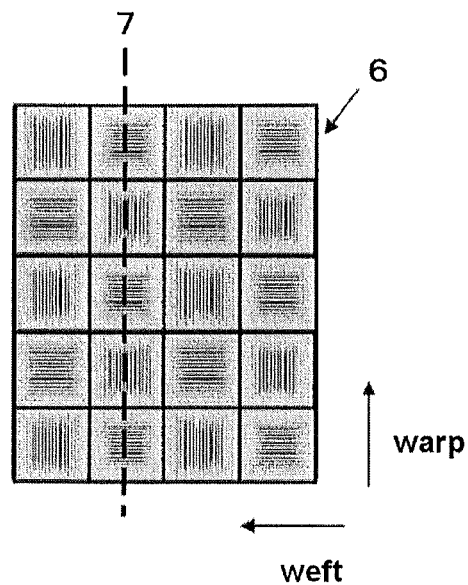
[Fig. 4]
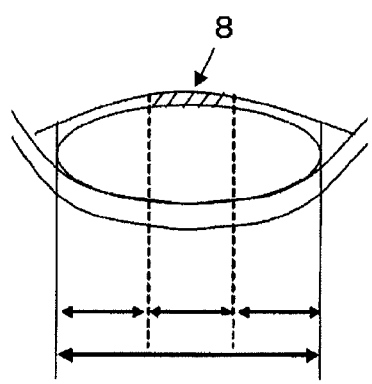

COATING FABRIC FOR AIRBAGS AND METHOD FOR MANUFACTURING THE SAME

TECHNICAL FIELD OF THE INVENTION

The present invention relates to a coating fabric used for airbags for cars and also to a method for manufacturing the same. More particularly, it relates to a coating fabric for airbags where, even when the coated amount to be adhered to the textile is made small, the burning speed as stipulated by FMVSS 302 is low and its variations are small and also to a method for manufacturing the same.

BACKGROUND ART

An airbag which has been quickly increasing in its installing rate in recent years as one of the safety parts for cars is used for such a purpose that, in car collisions, a sensor perceives the shock, gas of high temperature and high pressure is generated from an inflator and the airbag is quickly developed by the gas whereby the collision of the bodies or, particularly, the heads of a driver and a passenger to steering wheel, windshield, door glass, etc. is prevented and protected. In recent years, airbags for cars have been developed in their practical use not only for a driver seat and a passenger seat but also for knee airbags, side airbags, curtain airbags, etc. and installment of a plurality of airbags is now becoming common.

As regions and numbers of the installed airbags are increasing, there has been an increasing demand for making the weight and the size of an airbag system lighter and more compact and each of the parts of the system has been designed with a target of making the weight lighter and the size more compact. In view of such a background, airbags have been investigated for a plan of using a fabric where the yarn of small fineness is used or for a plan of reducing the type of elastomer of a coating textile and the coating amount.

For example, fineness of a filament used in a coating fabric for airbags is becoming finer from 940 dtex to 470 dtex and, in recent years, there has been a change to a fabric using the filaments where fineness is 350 dtex.

On the other hand, an elastomer resin which is coated to a coating fabric for airbags has been also changed from chloroprene to silicone resin. Further, its coating amount has been changed from 90-120 g/m² to 40-60 g/m² and, in recent years, it has been reduced to an extent of 25-40 g/m².

Although considerable enhancement has been achieved by such a means in view of package ability, it is not still in a fully satisfactory level and there has been a demand for further reduction of the coating amount.

With regard to a coating fabric for airbags where the coating weight of silicone resin is reduced, there is a disclosure for an airbag where elastomer is unbalancedly present in terms of a coating thickness ratio of not less than 3.0 in the knotted area of the textile to 1.0 of textile yarn area which constitutes the textile (see Patent Document 1). Although this airbag is improved in terms of the package ability, it is difficult to satisfy the flammability in case the resin is unbalancedly present when the coating amount is adjusted to not more than 20 g/m².

There is also a disclosure for a coating fabric for airbags where not less than 90% of the outer circumstances of the cross sections of warp and weft positioned at the resin-coated surface of the synthetic fiber textile are surrounded by said resin and the coating weight of the resin is not more than 20 g/m² (see claim 2 of Patent Document 2). In this fabric, although the adhesion of the fabric to the resin is enhanced, the resin coating positioned on the textile surface is thin whereby breakage is apt to happen on the coating and the flammability is insufficient.

PRIOR ART DOCUMENTS

Patent Documents

Patent Document 1: Japanese Patent Application Laid-Open (JP-A) No. 8779/94
Patent Document 2: Japanese Patent Application Laid-Open (JP-A) No. 2008-138305

DISCLOSURE OF THE INVENTION

Problem that the Invention is to Solve

The present invention has been created in view of the current status of the prior art and its object is to provide a coating fabric for airbags where, even when the coated amount to be adhered to the textile is made as small as 10 to 20 g/m², the burning speed as stipulated by FMVSS 302 is low in both directions of warp and weft and its variations are small and also to provide a method for manufacturing the same.

Means for Solving the Problem

The present invention has the constitutions of the following (1) to (8).

(1) A coating fabric for airbags where an elastomer is coated to at least one side of textile constituted from synthetic fiber filament, characterized in that
the coating weight of the resin is 10 g/m² to 20 g/m² and an average resin thickness of the head top in the textile surface is 4.0 μm to 12.0 μm in both directions of warp and weft and the average value of burning speed measured according to FMVSS 302 is not more than 60 mm/min in both directions of warp and weft and the maximum value thereof is not more than 1.2-fold to the average value in both directions of warp and weft.

(2) A coating fabric for airbags according to (1), wherein the average value of burning speed measured according to FMVSS 302 is not more than 55 mm/min in both directions of warp and weft and the maximum value thereof is not more than 1.15-fold to the average value in both directions of warp and weft.

(3) The coating fabric for airbags according to (1) or (2), wherein the elastomer is a solvent-free silicone rubber of an addition type.

(4) The coating for airbags according to any of (1) to (3), wherein the total fineness of the filament constituting the textile is 200 to 470 dtex.

(5) The coating for airbags according to any of (1) to (4), wherein the cover factor of the textile is 1,800 to 2,500.

(6) A method for the manufacture of the coating fabric for airbags according to any of (1) to (5), characterized in that the elastomer is coated by means of a knife coating, resin viscosity of the elastomer is 10,000 to 50,000 mPa·s, contacting length L between the textile and the knife is 0.05 to 0.5 mm and the coating thickness coefficient D represented by the following formula [I] is 2.7 to 7.0

$$D=(V \times \eta \times L)/F \qquad [I]$$

In the formula, V is a processing speed upon coating (m/sec), η is viscosity of resin (mPa·sec), L is contacting length (mm) and F is contacting pressure (kN/m).

(7) The method for the manufacture according to (6), wherein the front end of the knife blade used for the knife coating is substantially semicircular and the front end radius is 0.05 mm to less than 0.7 mm.

(8) The method for the manufacture according to (6), wherein the front end of the knife blade used for the knife coating is substantially angular and the front end width is 0.05 mm to 0.5 mm.

Advantages of the Invention

In the coating fabric for airbags according to the present invention, its burning speed is low even when thinly coated and its variation is small whereby the highly reliable airbags can be good package ability and the restrictions in view of the design inside the car can be made small.

BRIEF DESCRIPTION OF THE DRAWINGS

FIG. 1 is an illustrative drawing which shows the contacting distance (contacting length L) of a knife blade to a fabric during the knife coating.

FIG. 2 is an illustrative drawing which shows the stress (contacting pressure F) generated in pushing the knife thereinto during the knife coating.

FIG. 3 is a schematic chart of the SEM picture of the surface of the coating fabric for airbags according to the present invention.

FIG. 4 is an illustrative drawing which shows the position (the area with oblique lines) of the top area on the textile surface from the cross section upon cutting along the broken line in FIG. 3.

BEST MODE FOR CARRYING OUT THE INVENTION

The textile constituted from synthetic fiber filament in the present invention means a textile which is woven using synthetic fiber filament thread. The textile is excellent in mechanical strength and is excellent in such a respect that thickness can be made thin. With regard to the tissue of the textile, there may be applied plain weave, twill weave, satin weave and variant weave thereof, multiaxial weave, etc. and, among them, plain weave which is excellent in mechanical strength is particularly preferred.

With regard to the synthetic fiber, the particularly used ones thereof are aliphatic polyamide fiber such as Nylon 66, Nylon 6, Nylon 46 or Nylon 12; aromatic polyamide fiber such as aramid fiber; and polyester fiber such as polyethylene terephthalate, polytrimethylene terephthalate or polybutylene terephthalate. Besides the above, all-aromatic polyester fiber, poly-p-phenylenebenzobisoxazole fiber (PBO fiber), ultrahigh molecular polyethylene fiber, polyphenylene sulfide fiber, polyether ketone fiber, etc. can be used. However, when economy is taken into consideration, the polyester fiber and the polyamide fiber are preferred and the polyamide 66 is particularly preferred. In those fibers, a part of or all of them may be prepared from the recycled raw materials.

In the synthetic fibers as such, various kinds of additives may be contained therein for a purpose of enhancing the step passing property in the manufacturing step for starting yarn or the after-processing step. Examples of the additive used therefor include antioxidant, thermostabilizer, flattening/smoothening agent, antistatic agent, thickener and flame retardant. Further, the synthetic fiber may be a dope-dyed yarn or a yarn which is dyed after filature. Furthermore, the cross section of the single yarn may be any of the ordinary round cross section and the differently shaped cross section. It is preferred to use multifilament yarn of 72 filaments or more for the synthetic fiber in view of softness and flatness of the coated surface.

The coating fabric of the present invention may be a both-side-coated one where coating is done on both sides of the textile but, in view of the package ability, a single-side-coated one where coating is done merely on one side is more preferred.

In the coating fabric of the present invention, the average value of burning speed measured according to FMVSS 302 is not more than 60 mm/min in both directions of warp and weft and the maximum value thereof is not more than 1.2-fold to the average value in both directions of warp and weft. More preferably, the average value of burning speed is not more than 55 mm/min in both directions of warp and weft and the maximum value of burning speed is not more than 1.15-fold to the average value in both directions of warp and weft.

Since coating thickness of the resin is usually thin in the coating fabric of a thin application type, there happens the breakage in the coating resin during the burning test according to FMVSS 302 whereupon the burning speed increases. However, it has been found by the present inventors that, even when the coating weight is as small as 10 to 20 g/m², the burning speed is surprisingly greatly improved in spite of such a small amount provided that the average thickness of the resin at the top area in the textile surface is adjusted to an extent of 4.0 to 12.0 μm.

On the other hand, there is also a method where the flame-retarding component is abundantly contained in the coating resin so that the burning property is improved. However, in case the average resin thickness at the top area of the textile surface is less than 4.4 μm, the desired flame retarding property is hardly achieved by such a method. In addition, the adhesive property is deteriorated when the amount of the flame retarding component is increased. Further, when the average resin thickness is more than 12.0 μm, the knife coating becomes difficult.

With regards to the elastomer used as a coating resin, there have been known, for example, the resins of polyurethane type, polyester type, polyamide type, acrylic type, silicone type, polystyrene type, styrene-butadiene type and nitrile-butadiene type and any of those resins may be used so far as the predetermined property is available thereby. When adhesive force to the textile used as a fabric, ductility of the resin, etc. are taken into consideration, preferred ones are polyurethane type resin, acrylic type resin and silicone type resin and, in view of the softness of the fabric, silicone type resin is particularly preferred.

Examples of the silicone type resin include dimethylsilicone rubber, methylvinylsilicone rubber, methylphenylsilicone rubber, trimethylsilicone rubber, fluorosilicone rubber, methylsilicone rubber, methylphenylsilicone rubber, methylvinylsilicone rubber, epoxy-modified silicone rubber, acrylic-modified silicone rubber and polyester-modified silicone rubber. Among them, the particularly suitable one is methylvinylsilicone rubber of an addition type which has rubber elasticity after hardening, shows excellent strength and ductility and is advantageous in terms of cost.

When the silicone type resin is used, it is also possible to use a reaction hardening agent and, for example, there may be used a platinum type compound such as platinum powder, platinic chloride or platinic tetrachloride; a palladium compound; a rhodium compound; and an organic peroxide such as benzoyl peroxide, p-chlorobenzoyl peroxide and o-chlorobenzoyl peroxide.

It is preferred that an adhesive aid is made to contain in the silicone type resin for enhancing the adhesive property between the silicone type resin and the fabric. Examples of the adhesive aid include at least one or more member(s) selected from the group consisting of amino-type silane coupling agent, epoxy-modified silane coupling agent, vinyl type silane coupling agent, chlorine-type silane coupling agent and mercapto-type silane coupling agent.

An inorganic filler to be added to the silicone type resin has been already used as a filler for a purpose of reinforcement of silicone rubber, adjustment of viscosity, enhancement of heat resistance, enhancement of flame retarding property, etc. and the most representative filler is silica particles. Specific surface area of the silica particles is preferred to be not less than 50 m$^2$/g, more preferred to be 50 to 400 m$^2$/g and more preferred to be 100 to 300 m$^2$/g. When the specific surface area is within this range, excellent tear strength is apt to be given to the resulting hardened silicone. The specific surface area is measured by a BET method. One type of the silica particles may be used solely or two or more thereof may be used jointly. Examples of the silica particles used in the present invention include a natural one such as quartz, rock crystal or diatomaceous earth and a synthetic one such as dry silica, silica fume, wet silica, silica gel or colloidal silica.

The above-mentioned silica particles are preferred to be hydrophobic silica particles where the particle surface is subjected to a hydrophobic treatment using an organosilicon compound such as methylchlorosilane (e.g., trimethylchlorosilane, dimethyldichlorosilane and methyltrichlorosilane), dimethylpolysiloxane or hexaorganodisilazane (e.g., hexamethyldisilazane, divinyltetramethyldisilazane and dimethyltetravinyldisilazane) whereby better fluidity is apt to be given to the resin composition containing silicone type resin and additive.

Amount of the silica particles contained therein is preferred to be 10 to 20% by mass and more preferred to be 12 to 20% by mass to all of the silicone type resin. When the amount of the silica particles is less than the above range, the mechanical strength of the silicone rubber is apt to become low. On the other hand, when the amount of the silica particles is more than the above range, fluidity of the resin composition is apt to become low and not only the coating work is deteriorated but also the resin becomes brittle resulting in the tendency that the adhesive property is reduced.

The resin viscosity of the elastomer used in the present invention is preferred to be 10,000 to 50,000 mPa·sec, more preferred to be 15,000 to 40,000 mPa·sec and more preferred to be 20,000 to 35,000 mPa·sec. When the resin viscosity is less than the above range, it is difficult to ensure the resin thickness necessary for making the burning speed small since the resin comes into the textile. On the other hand, when the resin viscosity is more than the above range, it is difficult to adjust the coating amount to as small as not more than 20 g/m$^2$. Any of solvent type and non-solvent type ones may be used provided that adjustment to the above viscosity range is possible but, when the influence to the environment is taken into consideration, a non-solvent type one is suitable.

In the present invention, in the case of the resin composition containing an additive other than resin, viscosity of the resin composition is also defined as "viscosity of resin".

It is important to adopt a specific coating method of the resin in order to manufacture the coating fabric of the present invention where the coating amount of the resin is as small as 10 to 30 g/m$^2$ and the average resin thickness at the top area on the textile surface is 4.0 to 12.0 μm in both directions of warp and weft.

As to a method for coating the resin, the conventional known method may be used and the most preferred one is a knife coating where adjustment of the coating amount is easy and influence upon mixing the foreign matters (projecting things) is small. With regard to the knife used for the knife coating, the front end thereof is preferred to be substantially semicircular (for example, see FIG. 1 (a)) or substantially angular (for example, see FIGS. 1 (b) and (c)).

In order to reduce the coating amount of the resin to an extent of not more than 20 g/m$^2$ by a knife coating, it is effective to enhance the tension of the fabric in the direction of contacting pressure or, particularly, in the direction of movement. However, in the knife blade which has been conventionally used for the knife coating, the radius of the front end is 0.7 mm even in the sharp one when the front end is in semicircular shape. Therefore, in order to reduce the coating amount of the resin to an extent of not more than 20 g/m$^2$, it is necessary that the tension of the fabric in the movement direction is made considerably high. As a result thereof, the difference in the crimp rates in the directions of warp and weft becomes large and the thickness of the resin membrane in the direction where the crimp rate is large is reduced whereupon, in the burning test according to FMVSS 302, the outcome is that not only the mean value of the burning speed increases but also the variations become big.

On the contrary, it is preferred in the present invention for the manufacture of a coating fabric that, under the condition where the tension of the fabric is reduced, a knife blade having a substantially semicircular front end where the front end radius is 0.05 mm to less than 0.7 mm is used. More preferably, the front end radius is not more than 0.4 mm. Alternatively, it is preferred to use a knife blade having a substantially angular front end where the front end width is 0.05 mm to 0.5 mm. More preferably, the front end width is not more than 0.4 mm. When the knife blade which is sharper than the conventional knife blades is used as such, the crimp rate in the directions of both warp and weft can be made uniform. In the sharp-angle blade which has been used up to now, it was difficult to achieve the reproducibility of the coating weight in the fabric for which the coating weight is as small as not more than 20 g/m$^2$ in the case of without stipulating to semicircular or angular shape. In addition, in such a sharp knife blade, it is now possible to control the average resin thickness at the top area on the textile surface to an extent of 4.0 to 12.0 μm whereby, in the burning test according to FMVSS 302, the mean value of the burning speed can be reduced and, moreover, the variations thereof can be suppressed. The front end radius and the front end width of the knife blade can be measured by a radius gage or by a displacement measuring device using laser beam.

The contacting length L between the knife and the fabric in conducting the coating is important for making the average resin thickness at the top area on the textile surface within a range of 4.0 to 12.0 μm. In the present invention, the contacting length L means the distance where the knife and the fabric are made to contact (for example, see Referential number 1 of FIG. 1). In the manufacture of the coating fabric of the present invention, it is effective that the contacting length L is controlled to 0.05-0.5 mm. When the contacting length L is less than 0.05 mm, it is difficult to keep the coating amount uniform. On the other hand, when the contacting length L is more than 0.5 mm, the resin invades into the inner area of the textile whereby the outcome is that not only the ensurement of the coating thickness necessary for make the burning speed small is difficult but also the adjustment of the coating amount to not more than 20 g/m² is difficult.

In the manufacture of the coating fabric of the present invention, it is preferred to select the processing speed V, resin viscosity η, contacting length L and contacting pressure F so as to make the coating thickness coefficient D defined by the following formula [I] 2.7 to 7.0. As described above, resin viscosity η and contacting length L are preferred to be selected from the range of 10,000 to 50,000 mPa·s and 0.05 to 0.5 mm, respectively.

$$D = (V \times \eta \times L)/F \qquad [I]$$

In the formula, V is a processing speed upon coating (m/sec), η is viscosity of resin (mPa·sec), L is contacting length (mm) and F is contacting pressure (kN/m).

Here, the contacting pressure stands for the stress which is generated upon pushing the knife thereinto (see Referential number 4 of FIG. 2) and can be calculated from the tension of the fabric and the pushing angle of the knife. When the coating thickness coefficient D is less than 2.7, it is difficult to ensure the coating thickness of the resin necessary for making the burning speed small. When the coating thickness coefficient is more than 7.0, impregnating amount of the resin extremely lowers and the adhesive property is apparently inferior.

Tension of the fabric in the movement direction in the knife coating is preferred to be 300 to 700 N/m and more preferred to be 400 to 650 N/m. When the tension of the fabric in the movement direction is less than the above range, the size of the selvage of the base textile becomes high whereupon a big difference is apt to happen between the coating weights to the central area and to the terminal area of the fabric. On the other hand, when the tension of the fabric in the movement direction is more than the above range, the crimp rates in the directions of warp and weft become unbalanced whereby it is difficult to control the average resin thickness at the top area on the textile surface to an extent of not less than 4.0 μm in both directions of warp and weft.

In drying and hardening the coating after the application, the common heating methods such as hot air, infrared ray or microwave may be used. With regard to heating temperature and time, it will do if the temperature reaches the sufficient one for hardening the elastomer and it is preferred that the heating temperature is 150 to 220° C. and the heating time is 0.2 to 5 minute(s).

The total fineness of the filament thread constituting the textile is preferred to be 200 to 470 dtex. When the total fineness is more than 470 dtex, the thickness of the fabric increases whereupon the storing ability of airbag is apt to be deteriorated. On the other hand, when the total fineness is less than 200 dtex, mechanical characteristics of the airbag upon working such as tensile strength and tear mechanical characteristic of the coating fabric are apt to become low.

Cover factor of the textile to be used as a fabric is preferred to be 1,800 to 2,500 and more preferred to be 1,900 to 2,450. When the cover factor is less than the above range, there may be the case where no uniform coating is available in case the coating amount is not more than 20 g/m². On the other hand, when the cover factor is more than the above range, limitation may be resulted upon weaving and in the package ability. Incidentally, the cover factor CF is calculated by the following formula.

$$CF = \sqrt{(\text{Total fineness of warp}) \times (\text{Density of warp})} + \sqrt{(\text{Total fineness of weft}) \times (\text{Density of weft})}$$

Unit for the total fineness is dtex and that for the weaving density is (thread numbers)/2.54 cm.

When the cover factor of the textile is high, there can be prepared a coating fabric for airbags which is excellent in the low air permeability and excellent in the flame retarding property in a small coating weight even when the resin is not thickly coated to the knot area (hollow area of the texture).

EXAMPLES

As hereunder, the present invention will be specifically illustrated by way of Examples although the present invention is not limited to those Examples. Incidentally, various evaluations in the Examples were done according to the following methods.

(1) Total Fineness

This was measured according to the method mentioned in JIS L-1095 9.4.1.

(2) Filament Count

Filament count were counted from the cross-sectional picture of the filament thread.

(3) Density of Textile

This was measured according to the method mentioned in JIS L-1096 8.6.1.

(4) Viscosity of Resin

This was measured by a B type viscometer according to the method mentioned in JIS K-7117.

(5) Coating Weight

Mass of the coating fabric was measured according to the method mentioned in JIS L-1096 8.4.2. After that, as a blank sample, the processing treatment was carried out without coating the resin under the same condition at the coating and then mass of the resulting blank sample was measured according to the method mentioned in JIS L-1096 8.4.2. After that, the difference between the mass of the coating fabric and the mass of the blank sample was calculated as the coating weight. Incidentally, coating weight (g/m²) was expressed in terms of the mass (g) per 1 m².

(6) Average Resin Thickness at the Top Area on the Textile Surface

The coating fabric was cut with a razor at the position of broken lines shown in FIG. 3 and the picture of cross section was taken in the directions of warp and weft using an SEM and printed on paper. After that, the parts to which the resin was attached in the picture of the cross section were divided into three equal parts and the coating thickness of the top area (the part where the coating thickness of the resin is thinnest: see Referential number 8 of FIG. 4) was calculated.

Method for calculating the average coating thickness was that, from the ratio of the mass of the paper wherefrom the resin part was cut out to the mass of the whole paper, the average coating thickness was calculated in the directions of warp and weft. The average coating thickness was calculated down to the second decimal place followed by rounding off to the nearest first decimal place.

(7) Flammability

Measurement was carried out according to the method mentioned in FMVSS 302 (horizontal method) and, besides the highest value, the mean value was also determined. Incidentally, the case where the longitudinal direction was warp, it was called a warp sample while, the case where the longitudinal direction was weft, it was called a weft sample. Further, in order to evaluate the variations in the burning speed, the ratio of the highest value to the mean value (maximum value/mean value) was calculated in the directions of warp and weft.

Example 1

Polyamide 66 multi-filament yarn comprising 72 filaments where the total fineness was 470 dtex was woven by plain weave in a water jet room. After that, the product was subjected to a shrinkage processing using boiling water and subjected to a dry finishing at 110° C. to give a textile where the warp density was 46 warp/2.54 cm, the weft density was 46 weft/2.54 cm and the cover factor was 1,994. Onto one side of this textile, a solvent-free methyl vinylsilicone rubber of an addition type where the resin viscosity was adjusted to 20,000 mPa·sec was coated by means of a knife coating using a knife where the front end shape was semicircular and the front end radius was 0.3 mm under adjusting the contacting length L to 0.13 mm and the coating thickness coefficient to 4.0. After that, a hardening treatment was conducted at 190° C. for 2 minutes to give a coating fabric where the coating weight was made 14 g/m².

The characteristics of the resulting coating fabric were evaluated and shown in Table 1. In spite of the low coating weight, the resulting fabric showed very good flame-retarding property.

Example 2

Polyamide 66 multi-filament yarn comprising 144 filaments where the total fineness was 470 dtex was woven by plain weave in a water jet room. After that, the product was subjected to a shrinkage processing using boiling water and subjected to a dry finishing at 110° C. to give a textile where the warp density was 51 warp/2.54 cm, the weft density was 51 weft/2.54 cm and the cover factor was 2,211. Onto one side of this textile, a solvent-free methyl vinylsilicone rubber of an addition type where the resin viscosity was adjusted to 20,000 mPa·sec was coated by means of a knife coating using a knife where the front end shape was semicircular and the front end radius was 0.3 mm under adjusting the contacting length L to 0.13 mm and the coating thickness coefficient to 3.8. After that, a hardening treatment was conducted at 190° C. for 2 minutes to give a coating fabric where the coating weight was made 16 g/m².

The characteristics of the resulting coating fabric were evaluated and shown in Table 1. In spite of the low coating weight, the resulting fabric showed very good flame-retarding property.

Example 3

Polyamide 66 multi-filament yarn comprising 144 filaments where the total fineness was 470 dtex was woven by plain weave in a water jet room. After that, the product was subjected to a shrinkage processing using boiling water and subjected to a dry finishing at 110° C. to give a textile where the warp density was 54 warp/2.54 cm, the weft density was 54 weft/2.54 cm and the cover factor was 2,341. Onto one side of this textile, a solvent-free methyl vinylsilicone rubber of an addition type where the resin viscosity was adjusted to 20,000 mPa·sec was coated by means of a knife coating using a knife where the front end shape was semicircular and the front end radius was 0.3 mm under adjusting the contacting length L to 0.17 mm and the coating thickness coefficient to 3.5. After that, a hardening treatment was conducted at 190° C. for 2 minutes to give a coating fabric where the coating weight was made 15 g/m².

The characteristics of the resulting coating fabric were evaluated and shown in Table 1. In spite of the low coating weight, the resulting fabric showed very good flame-retarding property.

Example 4

Polyamide 66 multi-filament yarn comprising 144 filaments where the total fineness was 470 dtex was woven by plain weave in a water jet room. After that, the product was subjected to a shrinkage processing using boiling water and subjected to a dry finishing at 110° C. to give a textile where the warp density was 46 warp/2.54 cm, the weft density was 46 weft/2.54 cm and the cover factor was 1,994. Onto one side of this textile, a solvent-free methyl vinylsilicone rubber of an addition type where the resin viscosity was adjusted to 20,000 mPa·sec was coated by means of a knife coating using a knife where the front end shape was semicircular and the front end radius was 0.6 mm under adjusting the contacting length L to 0.38 mm and the coating thickness coefficient to 5.6. After that, a hardening treatment was conducted at 190° C. for 2 minutes to give a coating fabric where the coating weight was made 19 g/m².

The characteristics of the resulting coating fabric were evaluated and shown in Table 1. In spite of the low coating weight, the resulting fabric showed very good flame-retarding property.

Example 5

Onto one side of the textile obtained in Example 1, a solvent-free methyl vinylsilicone rubber of an addition type where the resin viscosity was adjusted to 15,000 mPa·sec was coated by means of a knife coating using a knife where the front end shape was semicircular and the front end radius was 0.3 mm under adjusting the contacting length L to 0.13 mm and the coating thickness coefficient to 3.0. After that, a hardening treatment was conducted at 190° C. for 2 minutes to give a coating fabric where the coating weight was made 16 g/m².

The characteristics of the resulting coating fabric were evaluated and shown in Table 1. In spite of the low coating weight, the resulting fabric showed very good flame-retarding property.

Example 6

Onto one side of the textile obtained in Example 1, a solvent-free methyl vinylsilicone rubber of an addition type where the resin viscosity was adjusted to 35,000 mPa·sec was coated by means of a knife coating using a knife where the front end shape was semicircular and the front end radius was 0.3 mm under adjusting the contacting length L to 0.13 mm and the coating thickness coefficient to 6.9. After that, a hardening treatment was conducted at 190° C. for 2 minutes to give a coating fabric where the coating weight was made 20 g/m².

The characteristics of the resulting coating fabric were evaluated and shown in Table 1. In spite of the low coating weight, the resulting fabric showed very good flame-retarding property.

Example 7

Onto one side of the textile obtained in Example 4, a solvent-free methyl vinylsilicone rubber of an addition type where the resin viscosity was adjusted to 20,000 mPa·sec was coated by means of a knife coating using a knife where the front end shape was angular and the front end width was 0.3 mm under adjusting the contacting length L to 0.30 mm and the coating thickness coefficient to 4.8. After that, a hardening treatment was conducted at 190° C. for 2 minutes to give a coating fabric where the coating weight was made 18 g/m$^2$.

The characteristics of the resulting coating fabric were evaluated and shown in Table 1. In spite of the low coating weight, the resulting fabric showed very good flame-retarding property.

Example 8

Onto one side of the textile obtained in Example 1, a solvent-free methyl vinylsilicone rubber of an addition type where the resin viscosity was adjusted to 25,000 mPa·sec was coated by means of a knife coating using a knife where the front end shape was semicircular and the front end radius was 0.15 mm under adjusting the contacting length L to 0.08 mm and the coating thickness coefficient to 3.0. After that, a hardening treatment was conducted at 190° C. for 2 minutes to give a coating fabric where the coating weight was made 11 g/m$^2$.

The characteristics of the resulting coating fabric were evaluated and shown in Table 1. In spite of the low coating weight, the resulting fabric showed very good flame-retarding property.

Example 9

Polyamide 66 multi-filament yarn comprising 108 filaments where the total fineness was 350 dtex was woven by plain weave in a water jet room. After that, the product was subjected to a shrinkage processing using boiling water and subjected to a dry finishing at 110° C. to give a textile where the warp density was 55 warp/2.54 cm, the weft density was 55 weft/2.54 cm and the cover factor was 2,058. Onto one side of this textile, a solvent-free methyl vinylsilicone rubber of an addition type where the resin viscosity was adjusted to 20,000 mPa·sec was coated by means of a knife coating using a knife where the front end shape was semicircular and the front end radius was 0.3 mm under adjusting the contacting length L to 0.13 mm and the coating thickness coefficient to 4.0. After that, a hardening treatment was conducted at 190° C. for 2 minutes to give a coating fabric where the coating weight was made 15 g/m$^2$.

The characteristics of the resulting coating fabric were evaluated and shown in Table 1. In spite of the low coating weight, the resulting fabric showed very good flame-retarding property.

Example 10

Polyamide 66 multi-filament yarn comprising 84 filaments where the total fineness was 270 dtex was woven by plain weave in a water jet room. After that, the product was subjected to a shrinkage processing using boiling water and subjected to a dry finishing at 110° C. to give a textile where the warp density was 70 warp/2.54 cm, the weft density was 70 weft/2.54 cm and the cover factor was 2,300. Onto one side of this textile, a solvent-free methyl vinylsilicone rubber of an addition type where the resin viscosity was adjusted to 20,000 mPa·sec was coated by means of a knife coating using a knife where the front end shape was semicircular and the front end radius was 0.3 mm under adjusting the contacting length L to 0.17 mm and the coating thickness coefficient to 3.5. After that, a hardening treatment was conducted at 190° C. for 2 minutes to give a coating fabric where the coating weight was made 14 g/m$^2$.

The characteristics of the resulting coating fabric were evaluated and shown in Table 1. In spite of the low coating weight, the resulting fabric showed very good flame-retarding property.

Example 11

Polyester multi-filament yarn comprising 144 filaments where the total fineness was 425 dtex was woven by plain weave in a water jet room. After that, the product was subjected to a shrinkage processing using boiling water and subjected to a dry finishing at 110° C. to give a textile where the warp density was 55 warp/2.54 cm, the weft density was 55 weft/2.54 cm and the cover factor was 2,268. Onto one side of this textile, a solvent-free methyl vinylsilicone rubber of an addition type where the resin viscosity was adjusted to 20,000 mPa·sec was coated by means of a knife coating using a knife where the front end shape was semicircular and the front end radius was 0.3 mm under adjusting the contacting length L to 0.17 mm and the coating thickness coefficient to 3.5. After that, a hardening treatment was conducted at 190° C. for 2 minutes to give a coating fabric where the coating weight was made 15 g/m$^2$.

The characteristics of the resulting coating fabric were evaluated and shown in Table 1. In spite of the low coating weight, the resulting fabric showed very good flame-retarding property.

Comparative Example 1

Onto one side of the textile obtained in Example 1, a solvent-free methyl vinylsilicone rubber of an addition type where the resin viscosity was adjusted to 20,000 mPa·sec was coated by means of a knife coating using a knife where the front end shape was semicircular and the front end radius was 0.3 mm under adjusting the contacting length L to 0.29 mm and the coating thickness coefficient to 2.0. After that, a hardening treatment was conducted at 190° C. for 2 minutes to give a coating fabric where the coating weight was made 16 g/m$^2$.

The characteristics of the resulting coating fabric were evaluated and shown in Table 1. In the resulting fabric, both mean value and variations of the burning speed in the warp direction were high and the flame-retarding property was poor.

Comparative Example 2

Onto one side of the textile obtained in Example 1, a solvent-free methyl vinylsilicone rubber of an addition type where the resin viscosity was adjusted to 17,000 mPa·sec was coated by means of a knife coating using a knife where the front end shape was semicircular and the front end radius was 0.8 mm under adjusting the contacting length L to 1.23 mm and the coating thickness coefficient to 5.5. After that, a hardening treatment was conducted at 190° C. for 2 minutes to give a coating fabric where the coating weight was made 25 g/m$^2$.

The characteristics of the resulting coating fabric were evaluated and shown in Table 1. In the resulting fabric, although the mean value of the burning speed was good, its variations were very big.

Comparative Example 3

Onto one side of the textile obtained in Example 3, a solvent-free methyl vinylsilicone rubber of an addition type where the resin viscosity was adjusted to 9,000 mPa·sec was coated by means of a knife coating using a knife where the front end shape was semicircular and the front end radius was 0.6 mm under adjusting the contacting length L to 0.38 mm and the coating thickness coefficient to 2.5. After that, a hardening treatment was conducted at 190° C. for 2 minutes to give a coating fabric where the coating weight was made 19 g/m².

The characteristics of the resulting coating fabric were evaluated and shown in Table 1. In the resulting fabric, all of mean value, highest value and variations of the burning speed were high and the flame-retarding property was very poor.

INDUSTRIAL APPLICABILITY

In the coating fabric for airbags according to the present invention, its burning speed is low even when the coating weight is low and variations are also small. Therefore, it can be used in broad areas as an airbag which is lightweight and is excellent in package ability and excellent in flame-retarding property not only as an airbag for head-on collision used for driver and passenger who is in a passenger seat but also as knee airbag, side airbag and curtain airbag where more package ability is demanded.

EXPLANATION OF REFERENCE NUMBER

1: contacting length L
2: elastomer
3: pushing direction of the knife

TABLE 1

| | | Example 1 | Example 2 | Example 3 | Example 4 | Example 5 | Example 6 | Example 7 | Example 8 |
|---|---|---|---|---|---|---|---|---|---|
| fiber material | | polyamide 66 | polyamide 66 | polyamide 66 | polyamide 66 | polyamide 66 | polyamide 66 | polyamide 66 | polyamide 66 |
| Total fineness | dtex | 470 | 470 | 470 | 470 | 470 | 470 | 470 | 470 |
| Filament count | — | 72 | 144 | 144 | 144 | 72 | 72 | 144 | 144 |
| Weaving density (warp/weft) | filament/2.54 cm | 46/46 | 51/51 | 54/54 | 46/46 | 46/46 | 46/46 | 46/46 | 46/46 |
| Cover factor | — | 1,994 | 2,211 | 2,341 | 1,994 | 1,994 | 1,994 | 1,994 | 1,994 |
| Resin viscosity | mPa · sec | 20,000 | 20,000 | 20,000 | 20,000 | 15,000 | 35,000 | 20,000 | 25,000 |
| Contacting length L | Mm | 0.13 | 0.13 | 0.17 | 0.38 | 0.13 | 0.13 | 0.3 | 0.08 |
| Contacting pressure F | kN/m | 110 | 115 | 168 | 224 | 110 | 110 | 210 | 112 |
| Coating thickness coefficient D | — | 4.0 | 3.8 | 3.5 | 5.6 | 3.0 | 6.9 | 4.8 | 3.0 |
| Coating weight | g/m² | 14 | 16 | 15 | 19 | 16 | 20 | 18 | 11 |
| Average coating thickness at the top area on the textile surface (warp/weft) | μm | 6.8/7.2 | 6.4/5.4 | 6.3/5.0 | 10.4/6.1 | 5.0/4.5 | 10.8/7.3 | 9.4/6.0 | 4.8/4.3 |
| Flammability Average value (AV) (warp/weft) | mm/min | 39/37 | 47/48 | 47/49 | 36/41 | 48/50 | 37/39 | 40/41 | 52/53 |
| Maximum value (Max) (warp/weft) | mm/min | 42/39 | 53/54 | 53/56 | 39/45 | 54/55 | 40/41 | 44/46 | 59/60 |
| Variation (Max/AV) (warp/weft) | — | 1.08/1.05 | 1.13/1.11 | 1.13/1.14 | 1.08/1.10 | 1.13/1.10 | 1.08/1.05 | 1.10/1.11 | 1.14/1.13 |

| | | Example 9 | Example 10 | Example 11 | Comparative Example 1 | Comparative Example 2 | Comparative Example 3 |
|---|---|---|---|---|---|---|---|
| fiber material | | polyamide 66 | polyamide 66 | polyester | polyamide 66 | polyamide 66 | Polyamide 66 |
| Total fineness | dtex | 350 | 270 | 425 | 470 | 470 | 470 |
| Filament count | — | 108 | 84 | 144 | 72 | 72 | 144 |
| Weaving density (warp/weft) | filament/2.54 cm | 55/55 | 70/70 | 55/55 | 46/46 | 46/46 | 46/46 |
| Cover factor | — | 2,058 | 2,300 | 2,268 | 1,994 | 1,994 | 1,994 |
| Resin viscosity | mPa · sec | 20,000 | 20,000 | 20,000 | 20,000 | 17,000 | 9,000 |
| Contacting length L | Mm | 0.13 | 0.17 | 0.13 | 0.29 | 1.23 | 0.38 |
| Contacting pressure F | kN/m | 110 | 168 | 110 | 465 | 414 | 224 |
| Coating thickness coefficient D | — | 4.0 | 3.5 | 4.0 | 2.0 | 5.5 | 2.5 |
| Coating weight | g/m² | 15 | 14 | 15 | 16 | 25 | 19 |
| Average coating thickness at the top area on the textile surface (warp/weft) | μm | 7.0/7.3 | 6.0/4.8 | 7.2/7.0 | 6.4/2.9 | 12.4/3.8 | 5.0/2.5 |
| Flammability Average value (AV) (warp/weft) | mm/min | 38/35 | 48/50 | 45/48 | 47/62 | 0/30 | 55/62 |
| Maximum value (Max) (warp/weft) | mm/min | 41/36 | 54/56 | 48/51 | 50/79 | 0/45 | 63/83 |
| Variation (Max/AV) (warp/weft) | — | 1.07/1.04 | 1.13/1.12 | 1.07/1.06 | 1.06/1.27 | —/1.50 | 1.15/1.34 |

4: contacting pressure
5: tension of the fabric
6: coating fabric
7: cutting position of the top area of the textile
8: top area of the textile

What is claimed is:

1. A coating fabric for airbags where a hardened elastomer is coated to at least one side of textile constituted from synthetic fiber filament, wherein
the hardened elastomer is a solvent-free methyl vinyl silicone rubber of an addition type and is prepared from a coating composition that contains a solvent-free methyl vinyl silicone and has a viscosity of 25,000 to 50,000 mPa·sec, in which the methyl vinyl silicone is the only polymer in the coating composition;
the coating weight is 10 g/m² to 20 g/m²;
an average coating thickness of the top area in the textile surface is 4.0 µm to 12.0 µm in both directions of warp and weft;
the fabric has a tension of 300 N/m to 700 N/m in the coating direction measured during coating; and
the average value of burning speed measured according to FMVSS 302 is not more than 60 mm/min in both directions of warp and weft, the maximum value of burning speed in the warp direction is not more than 1.15-fold to the average value of burning speed in the warp direction, the maximum value of burning speed in the weft direction is not more than 1.15-fold to the average value of burning speed in the weft direction, and the average and maximum values of burning speed in the warp and weft directions are obtained from a plurality of fabric samples.

2. The coating fabric for airbags according to claim 1, wherein the total fineness of the filament constituting the textile is 200 to 470 dtex.

3. The coating fabric for airbags according to claim 2, wherein the cover factor of the textile is 1,800 to 2,500.

4. The coating fabric for airbags according to claim 1, wherein the cover factor of the textile is 1,800 to 2,500.

5. The coating fabric for airbags according to claim 1, wherein the cover factor of the textile is 1,900 to 2,450.

6. The coating fabric for airbags according to claim 1, wherein the coating composition has a viscosity of 25,000 to 40,000 mPa·sec.

7. A method for the manufacture of the coating fabric for airbags according to claim 1, comprising:
applying the coating composition by means of a knife coating, wherein contacting length L between the textile and the knife is 0.05 to 0.5 mm and the coating thickness coefficient D represented by the following formula [I] is 2.7 to 7.0:

$$D=(V\times\eta\times L)/F \qquad [I]$$

in which V is a processing speed upon coating (m/sec), is viscosity of resin (mPa·sec), L is contacting length (mm) and F is contacting pressure (kN/m).

8. The method for the manufacture according to claim 7, wherein the front end of the knife blade used for the knife coating is substantially semicircular and the front end radius is 0.05 mm to less than 0.7 mm.

9. The method for the manufacture according to claim 7, wherein the front end of the knife blade used for the knife coating is substantially angular and the front end width is 0.05 mm to 0.5 mm.

10. A method for the manufacture of the coating fabric for airbags according to claim 2, comprising:
applying the coating composition by means of a knife coating,
wherein contacting length L between the textile and the knife is 0.05 to 0.5 mm and the coating thickness coefficient D represented by the following formula [I] is 2.7 to 7.0:

$$D=(V\times\eta\times L)/F \qquad [I]$$

in which V is a processing speed upon coating (m/sec), is viscosity of resin (mPa·sec), L is contacting length (mm) and F is contacting pressure (kN/m).

11. A method for the manufacture of the coating fabric for airbags according to claim 4, comprising:
applying the coating composition by means of a knife coating,
wherein contacting length L between the textile and the knife is 0.05 to 0.5 mm and the coating thickness coefficient D represented by the following formula [I] is 2.7 to 7.0:

$$D=(V\times\eta\times L)/F \qquad [I]$$

in which V is a processing speed upon coating (m/sec), is viscosity of resin (mPa·sec), L is contacting length (mm) and F is contacting pressure (kN/m).

* * * * *